United States Patent [19]

Brandt et al.

[11] 4,007,535

[45] Feb. 15, 1977

[54] LOCKING PULLER DEVICE

[76] Inventors: Paul W. Brandt; Dean S. Somerville, both of McHenry, N. Dak.

[22] Filed: Sept. 4, 1975

[21] Appl. No.: 610,412

Related U.S. Application Data

[63] Continuation-in-part of Ser. No. 550,978, Feb. 19, 1975, abandoned.

[52] U.S. Cl. .................................................. 29/261

[51] Int. Cl.[2] ........................................ B23P 19/04

[58] Field of Search ............. 29/261, 259, 260, 262

[56] References Cited

UNITED STATES PATENTS

| | | | |
|---|---|---|---|
| 2,303,560 | 12/1942 | Knight | 29/261 |
| 2,956,336 | 10/1960 | Peterson | 29/261 |

FOREIGN PATENTS OR APPLICATIONS

| | | | |
|---|---|---|---|
| 775,888 | 10/1934 | France | 29/261 |

*Primary Examiner*—James L. Jones, Jr.
*Attorney, Agent, or Firm*—Robert E. Kleve

[57] ABSTRACT

The invention comprises a locking puller for pulling such objects as the inner race of a bearing, gear, or sprocket off of shafts. The puller has three jaws each pivotally mounted to a collar to enable the jaws to pivot radially toward one another to engage such objects to pull such objects off of a shaft. The apparatus has a cam ring with a triangular shape and rearwardly extending braces which are fixed to a rearward ring. The collar has a rearwardly threaded cylindrical portion with a nut threaded onto the cylindrical portion. The nut has an annular groove with the rearward ring rotatably mounted to a nut in the groove. The cam ring surrounds jaws at a location forward of the pivotal mounting of the jaw. The jaws are tapered. The tapered surfaces of the forward end of the jaws have a radius greater than that of the inner surfaces of the cam ring when an object to be pulled is engaged between the jaws, whereby an operator may rotate the nut to move the rearward ring forward thereby moving the braces and cam ring forward until the cam ring engages the outer surfaces of the jaws in a wedging manner to thereby lock the jaws to the object to be pulled. A rod is threaded into the center of the collar which is thereafter rotated to move it forward until it engages the end of the shaft and force is applied to move the rod further forward with the jaws thereby pulling the object rearward towards the end of the shaft.

1 Claim, 13 Drawing Figures

LOCKING PULLER DEVICE

This application is a continuation-in-part of our earlier co-pending U.S. patent application Ser. No. 550,978, filed Feb. 19, 1975, now abandoned.

This invention relates to pullers and the like.

It is an object of the invention to provide a novel puller which can be used rapidly and safely to pull and remove such things as the inner race of a bearing, a gear, or a wheel off of a shaft.

It is another object of the invention to provide a novel puller which has jaws to pull and remove such things as the inner race of a bearing, or a gear, or a wheel off of a shaft and which has a cam ring which locks the jaws on an object while pulling to prevent the jaws from accidentally slipping off.

It is another object of the invention to provide a novel puller which has adjustable jaws for pulling and removing such different sized objects as an inner race of a bearing or a gear off of a shaft and which has a cam ring to adjustably lock the jaws on the object to prevent the jaws from accidentally slipping off of the shaft.

It is another object of the invention to provide a novel puller which has jaws engaging for pulling and removing the objects such as the inner race of a bearing or a gear off of a shaft and which has a cam ring which is adjustable to different positions depending upon the radial adjustment of the jaws to cam and lock the jaws on the engaged object to prevent the jaws from slipping off.

It is another object of the invention to provide a novel puller for pulling objects off of a shaft which has jaws to engage about the objects and which jaws are pivotally mounted to adjust and embrace objects of different sizes and which has a normally mounted cam ring, which once the jaws have been mounted onto the object for pulling, can be moved to cam and lock the jaws to the object to prevent the jaws from accidentally slipping off.

Further objects and advantages of the invention will become apparent as the description proceeds and when taken in conjunction with the accompanying drawings wherein.

Briefly stated, the invention comprises a locking puller, said puller having three jaws. Each jaw is pivotally mounted to a collar to enable the jaws to pivot radially toward one another to engage such objects as the inner race of a bearing, or a gear, or a wheel to pull such objects off of a shaft, a cam ring having a triangular shape surrounds the jaws, said cam ring has rearward extending braces fixed to the cam ring and projecting rearward with their rearward ends fixed to a rearward collar with the rearward collar rotatably mounted on a threaded nut and threaded nut threadably mounted on a cylindrical threaded portion behind the jaw collar, whereby rotation of the threaded nut will move the rearward collar, braces and cam ring forward in a manner to cause the inner surface of the cam ring to cam against the outer surfaces of all the jaws simultaneously, while the jaws are engaged to an object being pulled to lock the jaws firmly to the object to prevent the jaws from accidentally slipping off.

Figure 1:
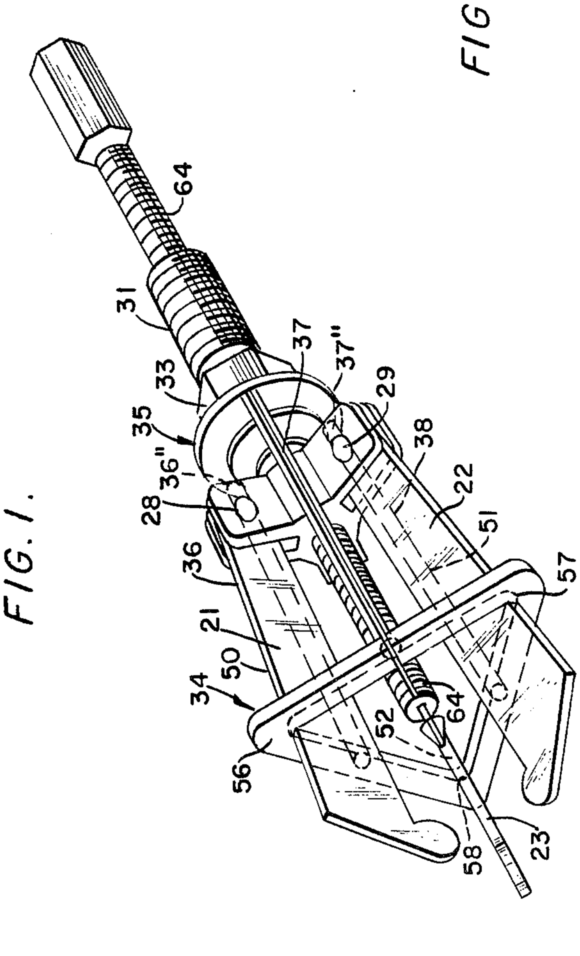
FIG. 1 is a perspective view of the inner race puller invention.

Referring more particularly to the drawings in FIG. 1 the inner race puller invention 20 is illustrated as having three jaws 21, 22, and 23. The jaws 21, 22, and 23 are each pivotally mounted to a jaw collar 24. The jaw collar 24 has three pairs of mounting flanges 25, 25', 26, 26', 27, and 27' with each projecting pair of flanges mounted at 120° intervals to the next about the jaw collar 24. Each of the jaws 21, 22, and 23 has pins 28, 29, and 30, respectively. The pins project out of the side of the rear end of the jaws. The pin 28 of jaw 21 is pivotally mounted in bores 28' and 28'' of mounting flanges 25 and 25'. The pin 27 of jaw 22 is pivotally mounted in bores 29' and 20'' of mounting flanges 26 and 26', respectively. The pin 30 of jaw 23 is pivotally mounted in bores 30' and 30'' of mounting flanges 27 and 27'.

The jaw collar has a reduced cylindrical portion 31 projecting rearward from the jaw collar which cylindrical end portion 31 is fixed to the jaw collar. The cylindrical portion 31 has external threading 32. The threaded nut 33 has internal threading engaging the external threading 32 of the cylindrical portion 31, whereby rotation of the threaded nut 33 on the threaded portion 31 will move the nut forward or backward on the cylindrical portion.

A cam ring apparatus has triangular shaped steel rod or steel ring 34 at the front and a circular steel ring 35 at the rear with three braces 36, 37, and 38 fixed between the triangular ring and the circular ring at 120 degree intervals about the longitudinal axis of the cam ring apparatus.

The three braces 36, 37, and 38 are fixed to the triangular ring 34 at their one ends 36', 37', and 38'.

The braces are fixed at their other ends 36'', 37'', and 38'' in the annular or circular collar or ring 35.

The threaded nut 33 has an annular groove 39 and the steel ring 35 has a cylindrical inner edge 40 which is slightly larger in circumference than the circumference of the cylindrical base or bottom 41 of the groove and the thickness of the ring from its front surface 42 to its rear surface 43 is less than the width of the annular groove 39 from its front wall 44 to its rearward wall 45, so that the nut may be rotated freely relative to steel ring 35 while the steel ring remains in the groove.

Figure 2:
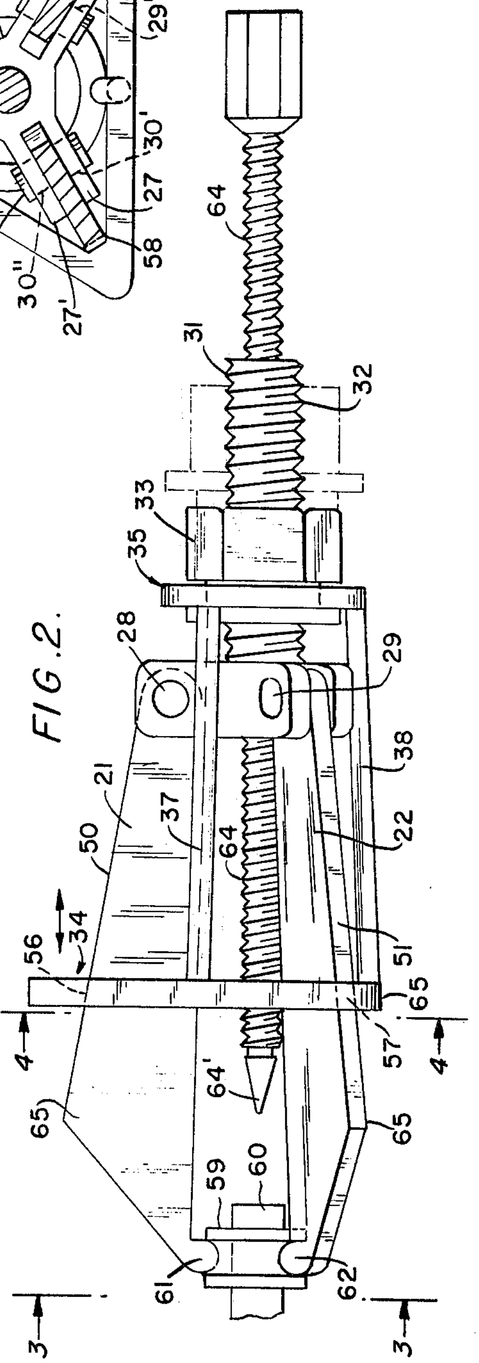
FIG. 2 is a side elevational view of the inner race puller invention.
Figure 6:
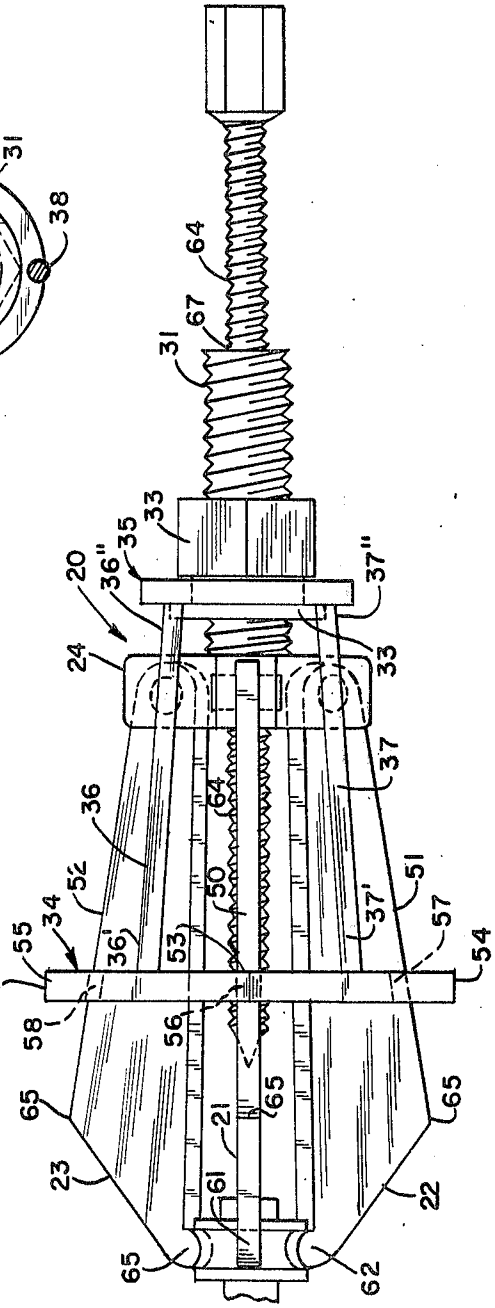
FIG. 6 is a cross-sectional view taken along line 6—6 of FIG. 5.

The rotation of the threaded nut 33 counterclockwise when viewed from FIG. 6 causes the threaded nut 33 to move forward from right to left when viewed from FIG. 2 toward the jaws by the threaded engagement of the nut 33 with the threaded surface of the cylindrical portion 31. The rotation of the threaded nut 33 clockwise, when viewed from FIG. 6, causes the threaded nut 33 to move rearward from left to right, when viewed from FIG. 2, in a direction away from the jaws by its threaded engagement with the threaded surface of the cylindrical portion 31.

The forward movement of the threaded nut moves the cam ring apparatus forward by the rotation of the nut which causes the forward annular wall in the annular groove of the nut to engage the circular ring or collar 33 of the cam ring apparatus and pushes the collar forward thereby pushing the braces and cam ring forward right to left when viewed from FIG. 2 relative to the jaws and cylindrical portion.

Conversely, the rearward movement of the threaded nut causes the cam ring apparatus to move rearward by the rotation of the nut which causes the rearward annular wall in the annular groove of the nut to engage the circular ring or collar of the cam ring apparatus to push the collar rearward thereby pushing the braces and cam ring rearward (left to right when viewed from FIG. 2) relative to the jaws and cylindrical portions.

Figure 5:
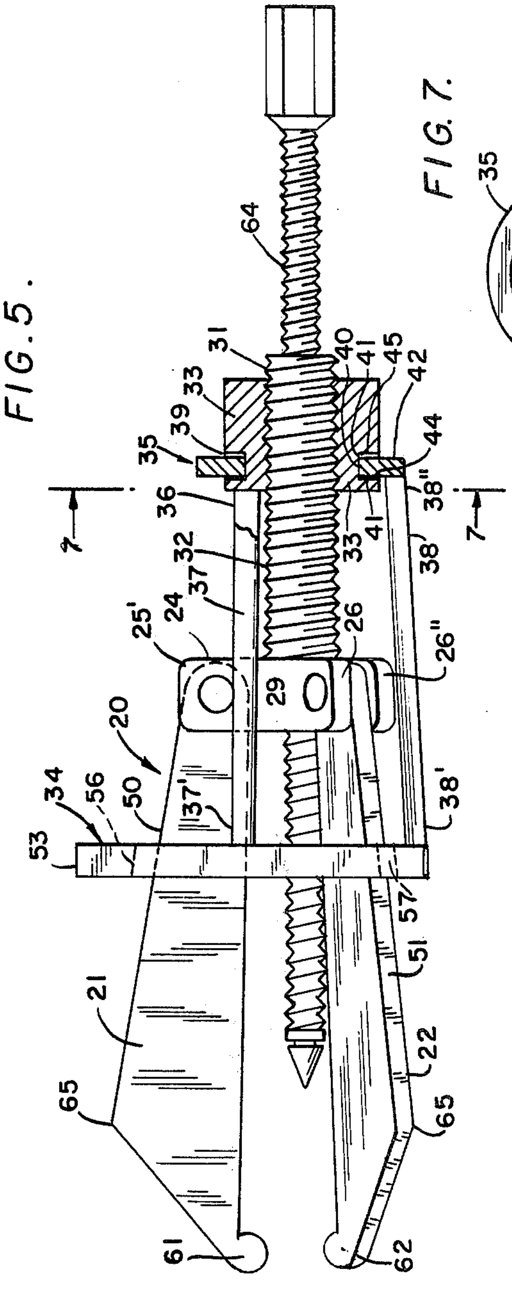
FIG. 5 is a side elevational view of the inner race puller invention with the cam ring mounted rearwardly by rotation of the threaded nut and with portions cut away to reveal the interior construction.
Figure 7:
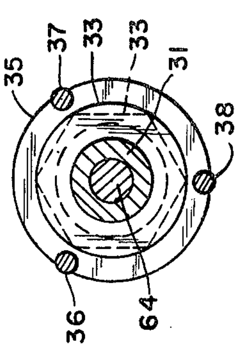
FIG. 7 is a top plan view of the inner race puller invention.

While the frictional engagement of the nut against the collar as the nut is rotated may cause the ring to rotate a few degrees when the cam ring is in its lock position shown in FIG. 5, before the cam ring engages the converging sides 46 and 47 of the cam ring adjacent each corner of the ring. However, as the cam ring is moved forward toward the nose of the jaws the sides of the ring converging even closer to the outer corners 48 and 49 of each of the jaws and begin to engage against the corner and force the cam ring back into alignment so that the tapered surfaces at the apex of the corners are aligned directly over the tapered surfaces of the jaws by the time the cam ring reaches its position shown in FIG. 2.

The straight sides of the cam ring at each corner of the ring extend along paths which have a radius less than the radius of the tapered inner surfaces of the ring at the apex at each corner of the ring and thereby serve as notches to prevent the cam ring from rotating relative to the jaws while the cam ring is moved forward or backward except for a few degrees while the cam ring is in its lock position and progressively less as the cam ring is moved forward.

The jaws 21, 22, and 23 are identical in shape. Each one has tapered outer surfaces 50, 51, and 52, respectively, along its length. The triangular cam ring forms an equalateral triangle with the converging sides forming three corners 53, 54, and 55 with the inside surfaces 56, 57, and 58 at the corners of the cam ring moving along the tapered outer surfaces 50, 51, and 52, respectively. The inside surfaces of the corners of the triangle cam ring have a shallow taper to generally conform to the taper of the outside surfaces 50, 51, and 52.

OPERATION

The puller invention 20 will be used to pull such things as the inner race 59 of a bearing off of a shaft 60, as illustrated in FIG. 2.

Figure 3:
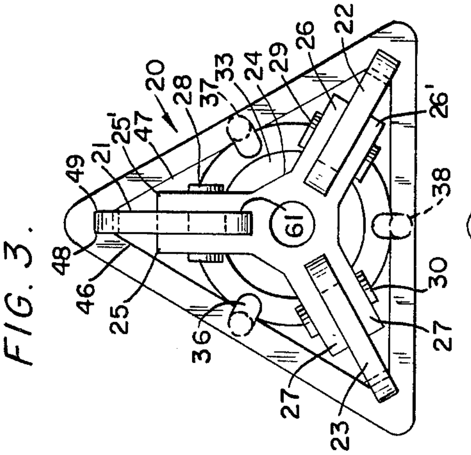
FIG. 3 is a front elevational view of the inner race puller invention.
Figure 4:
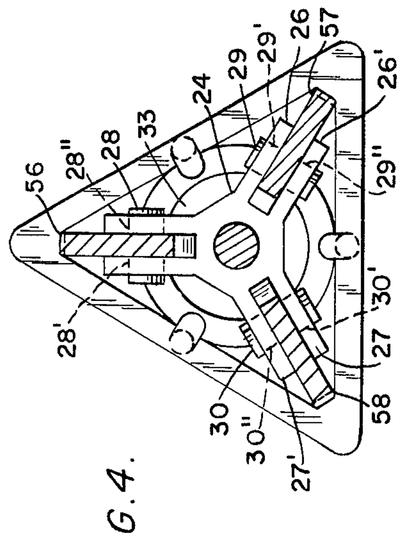
FIG. 4 is a cross-sectional view taken along line 4—4 of FIG. 2.

The operator will first rotate the threaded nut 33, clockwise when viewed from FIG. 3, to back threaded nut and the cam ring rearwardly away from the nose of the jaws to its position shown in FIG. 5, so that the jaws are free of the cam ring to pivot apart, so that the operator can be able to place the noses 61, 62, and 63 of the jaws by hand into cylindrical inner surfaces 64 of the inner race 59.

The jaws will be held there with one hand, with the noses 61, 62, and 63 firmly engaged in the inner surfaces of the inner race at 120° intervals, while with the other hand, the operator will rotate the threaded nut 34 counterclockwise, when viewed from FIG. 3, to move the cam ring apparatus forward from its position shown in FIG. 5 to its position shown in FIG. 2.

Since the tapered outer surfaces 50, 51, and 52, at the rear end of jaws lie in a radius relative to their longitudinal axis of the tool which is less than the radius of each of the inside surfaces 56, 57, and 58 or the triangular cam ring. The cam ring will move forward freely at first, as the inner surfaces 56, 57, and 58 of the cam ring will not be in contact with the outside surface 50, 51, and 52 of the jaw.

However, as the cam ring approaches its position shown in FIG. 2 near the nose of the jaws, the inside surfaces 56, 57, and 58 of the ring and the outside surfaces 50, 51, and 52 of the jaw will come into a wedging, caming engagement, since the outside surfaces 50, 51, and 52 of the jaws are tapered to form an even unwinding radius in the direction toward the nose of the jaw and when the cam ring reaches its position shown in FIG. 2, it will begin to reach tapered surfaces which have the same radius as the inner surfaces of the ring and the cam locking engagement takes place. The inner surfaces have each the same radius will simultaneously engage and wedge against the outer surface of the jaw to lock all the jaws to the inner race of the bearing, as shown in FIG. 2.

Since the cam ring engages all the jaws at simultaneously the same time and the same point, it acts to align the jaws in proper perpendicular and coaxial alignment to the inner race.

The cam ring's engagement with the outer surfaces of the jaw simultaneously cams and wedges against the outer surface of each of the jaws in a direction radially inward toward the longitudinal axis of the tool and simultaneously forces the noses of the jaws tightly against the inner race of the bearing and locks the jaws to the bearing.

The nut will be continued to rotate in the same direction until the inner surfaces of the cam ring are firmly and tightly wedged against the outer surfaces of the jaws.

The operator may now move his hands from the noses of the jaws and the cam ring will keep the jaws locked tightly about the inner surface of the bearing, so that the pulling operation can begin. The tool invention 20 will support itself in the air supported only by the jaws locked about the inner surface of the bearing.

The angle of the tapered outer surfaces of the jaws will be shallow enough in relation to the longitudinal axis of the tool and the pitch of the threading of the nut will be shallow enough that the nut will not normally rotate back under the reactive force of the weight of the tool urging the jaws away from the inner surface of the bearing nor will it rotate back during the pulling operation.

The operator will now rotate the threaded rod 64 counterclockwise when viewed from FIG. 2, to move the rod 64 forward until the point 64' of the rod is engaged against the end of the shaft.

The operator will then use a wench to rotate the rod further forward to push the rod against the shaft with the reactive force causing the jaws to pull the inner race of the bearing rearwardly off of the shaft.

If the bearing is stuck particularly hard, it may be necessary to use a hammer to strike against the rearward end of the rod 64 to push the rod against the shaft. This reaction causes the jaws to pull the inner race rearwardly on the shaft.

The rod will be rotated to move it forward against the shaft after each movement of the bearing until the bearing is moved rearwardly off of the shaft.

The cam ring by wedging or caming down against the outer surfaces or edges of the jaws acts to prevent the jaws from accidentally slipping off while performing the pulling operation by rotating the rod 64 or by striking the end of the rod 64.

It has been found from actual practice that the jaws do not slip off the surfaces of the inner race of a bearing during the pulling operation when locked by the cam ring and that the likelihood of the jaws slipping off is quite remote, unless possibly extreme abusive tactics are used.

It has also been found from actual practice that the tool is very effective in removing inner raceses of bearings from a shaft which has been stuck on a shaft without the need to cut the inner race before hand.

When pulling off gears, wheels and sprockets, the jaws have a greater more positive gripping surface to engage than when pulling off inner races and there is even less chance of the jaws accidentally slipping off.

The tool may be used to pull a wheel, a sprocket, or a gear off of a shaft of the similar size as the inner race or somewhat smaller or larger by placing the jaws over the top of the gear with the nose down against the front outer edge of the gear, wheel, or sprocket and then moving the cam ring apparatus forward, by the threaded nut, to cam the cam ring against the jaws and lock them to the wheel, sprocket, or gear and therefor using the rod 64 to push against the shaft to pull the wheel, sprocket, or gear off of the shaft.

It is intended that the tool be made in different sizes for pulling relatively different sized objects. However, each tool of a particular size will be able to pull bearings, sprockets, or wheels and the like off of a shaft of different sizes within the normal operating range of that particular size tool.

If the object is only somewhat larger than illustrated, the jaws will only be spread a little further apart and engaged about the object being pulled, and the cam ring will simply, simultaneously engage and wedge and lock against the tapered outer surfaces of the jaws sooner at some point to the right of the point of engagement illustrated in FIG. 2 to lock the jaws to the object depending upon the size of the object.

Similarly, if the object being pulled is only somewhat smaller, the jaws will be closer together than illustrated and engaged about the object being pulled, and the cam ring will simultaneously engage, wedge, and lock the tapered outer surfaces of the jaws or arms at a point to the left of the point of engagement illustrated in FIG. 2, to lock the jaws depending upon the size of the object.

The cam ring may be backed further to the right by rotation of the threaded nut further than illustrated in FIG. 2. If desired it may be backed entirely off the jaws, jaw collar, and cylindrical portion.

Generally speaking, the cam ring creates an effective camming and locking action if engaged at any point along the tapered surfaces 50, 51, and 52. An effective locking cam and locking action of the cam ring can be obtained if engaged at any point on these tapered surfaces to the left of the position of the cam ring illustrated in FIG. 2 up to the pointed tops 65 of the jaws, and an effective cam locking action can be obtained if engaged at any point to the right of its position shown in FIG. 2 to at least approximately its position shown in FIG. 5 and further beyond that point. However, the more effective locking action is created when the cam ring engages the jaws close to the nose of the jaws, at least some point closer to the nose of the jaws than to the pivot point of the jaws, since the closer the point of engagement is to the nose of the jaws the more effective the locking engagement is.

It may also be desirable to have the outer tapered surfaces made shallower and longer than illustrated so that the tops 65 of jaws are closer to the nose of the jaws in which case the cam ring will be able to wedge and lock in a position closer to the nose of the jaws. The braces and length of the cylindrical portion will have to be increased to allow the additional travel of the cam ring.

As a modification, a hydraulic cylinder in larger models may be manufactured in the center bore 67 in place of the threaded rod, with the piston of the cylinder at the forward end and being projected hydraulically out of the cylinder coaxially in place of and along the path of the threaded rod, with the piston pushing against the shaft to provide the pushing action.

Also, while the cam ring apparatus is illustrated in connection with a three jaw puller construction, the cam ring could be used in connection with only a two jaw puller mechanism and act to wedge and lock against the jaws in diametrical opposite directions by using, for example, a circular ring or a narrow rectangular ring.

Also, the cam ring apparatus could be used in connection with a jaw puller mechanism having more than three jaws by using a circular ring.

Moreover, the cam ring could be made circular instead of triangular and used in connection with the three jaw mechanism.

The modification being added by this continuation-in-part application is illustrated in FIGS. 8–13, inclusive. Wherein the mounting collar 24 has a three metal band springs 65, 66, and 67 which are mounted in the mounting lugs 28' and 28'', 29', 29'', 30', and 30'' of mounting collar 24. The springs 65, 66, and 67 have each side flange portions 68 and 69 with bores 70 and 70' therethrough. The side flanges rest along the inside of the mounting lugs 28', 28'', 29', 29'', 30', and 30'' through the bores 70 and 70' to secure the springs to the mounting lugs, but enable the jaws 21, 22, and 23 to also be mounted to the mounting lugs by the pins 28, 29, and 30 of the jaws passing through the bores 70 and 70' of each spring and through the bores of their respective mounting lugs 28', 28'', 29', 29'', 30', and 30''.

The springs 65, 66, and 67 have each a spring strap portion 71. The spring strap portion 71 formed integrally with the side flanges 68 and 69 at their rearward end 72. The spring strap portion 71 of each spring 65, 66, and 67, is bent upward slightly at its forward end 73 so as to engage against the undersurfaces 74, 74', and 74'' of the jaws 21, 22, and 23, respectively, and provide constant pressure against the jaws and urge the jaws outward.

Figures 8, 9, 10, 11, 12, 13:
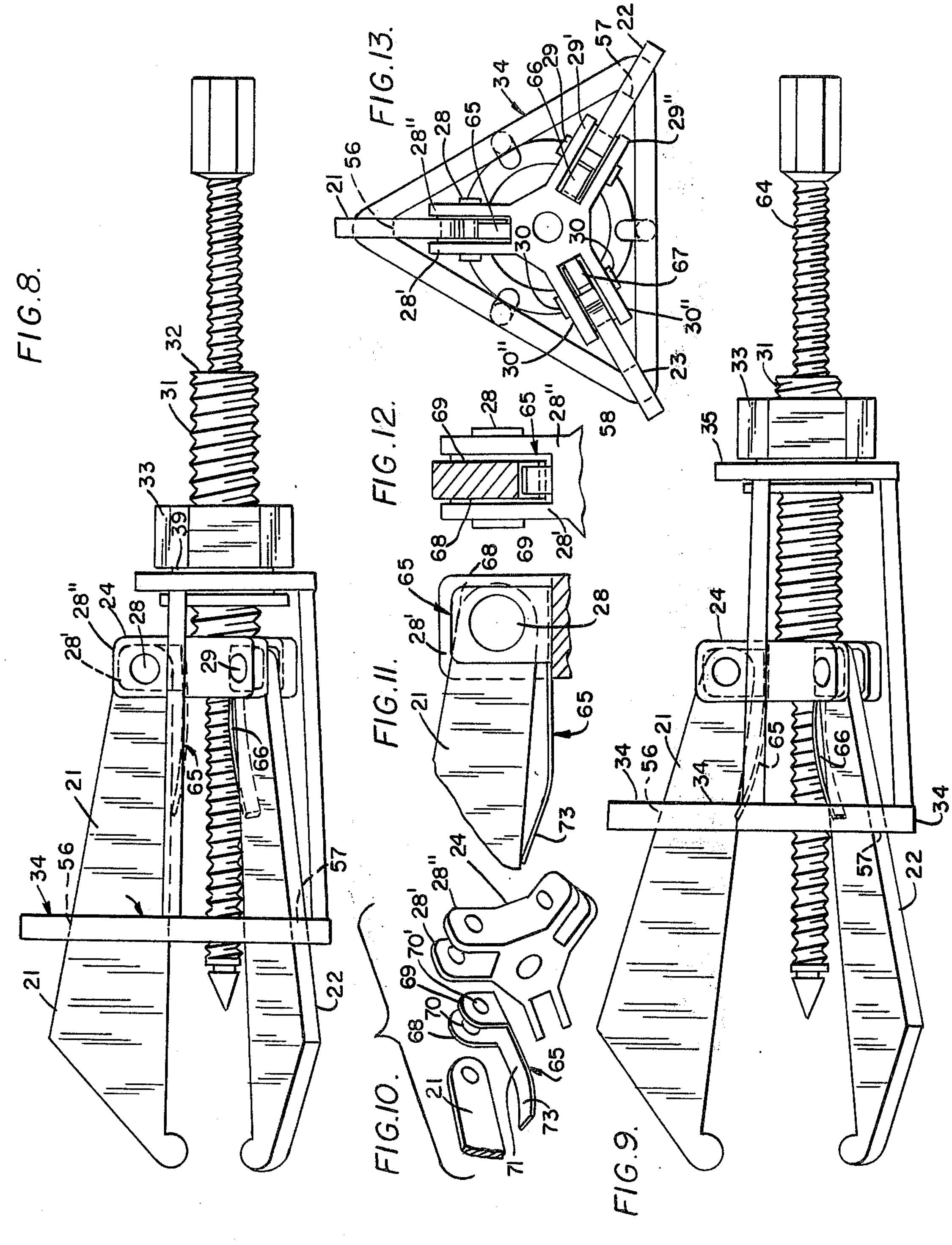
FIG. 8 is a side elevational view of the modified puller invention having spring members urging the jaws apart to hold the jaws against the cam ring with the cam ring moved forward causing the jaws to converge toward one another.
FIG. 9 is a side elevational view of the modified puller having spring members urging the jaws apart with the cam ring moved rearward, thereby enabling the jaws to spread apart further than illustrated in FIG. 8.
FIG. 10 is a fragmentary perspective exploded view of the one spring member, a portion of one of the jaws, and the mounting collar.
FIG. 11 is an enlarged fragmentary cutaway side elevational view of one of the spring members shown mounted to one of the pair of lugs in the mounting collar and one of the jaws.
FIG. 12 is an enlarged fragmentary front elevational view of the spring members mounted in one of the pair of lugs in the mounting collar and one of the jaws.
FIG. 13 is a front elevational view of the modified puller invention with the jaws spread apart as illustrated in FIG. 9.

The springs act to urge the jaws outward so that the jaws continually engage against the cam ring as the cam ring is moved backward from its position shown in FIG. 8 to its position shown in FIG. 9, thereby causing the jaws to spread apart evenly as the cam ring moves backward or rearwardly. As the cam ring moves forward it causes the jaws to converge together simultaneously and equally.

The springs 65, 66, and 67 are made of relatively strong spring steel, so as to have enough force or pressure to push and maintain the jaws continuously against the inside corners 56, 57, and 58 of the cam ring. This force of the springs is strong enough to overcome the weight of the jaws so that the springs will hold the jaws against the inside corners of the cam ring.

Except for the function of the springs and their action upon the jaws, the puller illustrated in FIGS. 8–13 operates essentially in the same manner as the puller illustrated in FIGS. 1–7.

Thus, when the jaws are being mounted to an object to be pulled, as the cam ring is moved forward toward the nose of the jaws from FIG. 9 to FIG. 8 by rotation of the nut 33, the inside corners 56, 57, and 58 of the cam ring will engage and continuously slide along the outer surfaces of the jaws to gradually pivot the jaws toward one another and the springs 65, 66, and 67 will be strong enough to continually hold the jaws 21, 22, and 23, respectively, against the inside corners 56, 57, and 58 of the cam ring so that the cam ring can slowly and continuously cam the jaws 21, 22, and 23 radially toward one another about their pivots 28, 29, and 30, converging equally and uniformly toward and about an object converging at a rate depending upon the cam ring 33 rate of movement by the rotation of the threaded nut 33 on the threaded sleeve 31 to move the cam ring and nut forward. This also enables the jaws to be more easily mounted to the object, since they move equally and uniformly toward one another and equally engaging about the object. This enables the jaws to be aligned and locked more uniformly and accurately and easily about an object. The noses of the jaws engage said object by engaging the inner surfaces of the inner race or over the forward edge of a gear or sprocket as already described in connection with the puller illustrated in FIGS. 1–7. Consequently, the jaws do not have to be held about an object as the cam ring is moved forward to lock the apparatus or puller to the object being pulled. Thereafter the threaded rod 64 is threaded forward to perform the pulling operation already described in connection with the puller illustrated in FIGS. 1–7.

When the cam ring is moved rearwardly from FIG. 8 to FIG. 9 by the rotation of the nut, after the object has been pulled off of a shaft, the springs 65, 66, and 67 push the jaws 21, 22, and 23 apart and against the inside corners 56, 57, and 58 of the cam ring so that the jaws 21, 22, and 23 follow the cam ring as the cam ring moves rearwardly by the outer edges of the jaws continuously sliding along the inside surfaces 56, 57, and 58 and spreading gradually and uniformly and evenly apart pivoting about their pivot points 28, 29, and 30 and diverging at a rate depending upon the rate of movement of the cam ring by the rotation of the threaded nut 33 on the threaded sleeve 31 in the opposite direction to move the cam ring rearward and the nut rearward. Thus, the springs 65, 66, and 67 act as a cam follower causing the jaws 21, 22, and 23 to follow the inside surfaces 56, 57, and 58 of the cam ring as the cam ring moves either forward or rearward by urging the jaws to slide along the inside corners, thereby converging toward one another under the cam action of the cam ring as the cam ring moves forward and diverging away from one another sliding and following the cam ring and pivoting apart as it moves backward.

Thus, the springs cause the jaws to continuously follow the inside surfaces of the cam ring as the cam ring moves forward and rearward, thereby converging evenly toward one another as the cam ring moves forward and diverging evenly away from one another as the cam ring moves rearwardly.

When the cam ring has been moved forward by rotation of the nut causing the jaws to converge about the object, the nut will be rotated further to tighten and wedge the cam ring to the jaws and thereby tighten and lock the jaws to the object.

After the object has been pulled off of a shaft and it is desired to disengage the jaws from the object, in some instances, the cam ring may be so firmly wedged against the jaws that the cam ring is frozen or locked to the jaws. However, the rotation of the nut in the direction to cause the cam ring to move rearwardly pulls the cam ring rearward and thereby unlocks the cam ring from the jaws readily and easily.

The springs 65, 66, and 67 have to have only enough force to lift or push the jaws themselves apart and against the am ring as the cam ring moves backward.

While the springs 65, 66, and 67 have been found most effective as a means of causing the jaws to follow the movement of the cam ring forward and rearward and thereby diverge evenly and converge uniformly. It is also possible to provide a cam follower construction between the jaws and the cam ring by a pin and groove connection for example, to cause the jaws to follow the cam ring in the same manner.

It will be obvious that various changes and departures may be made to the invention without departing from the spirit thereof and accordingly it is not intended that the invention be limited to that specifically described in the specification or as illustrated in the drawings but only as set forth in the appended claims wherein.

We claim:

1. A locking puller device for pulling an object such as an inner race of a bearing off of a shaft, said device having three tapered jaws, a collar having mounting means at spaced intervals about the collar, said jaws projecting forward and having their rearward ends pivotally mounted to said mounting means of said collar, a cam ring framework comprising a cam ring laterally surrounding said jaws at a location spaced forward of the pivotal mounting of the collar, said collar having a sleeve fixed thereto and projecting rearward from the collar, a single threaded nut means threaded onto said sleeve, said cam ring framework also including a rear collar mounted to said single threaded nut means by an annular rotatable tongue and groove connection, said framework including braces fixed between the cam ring and the rear collar to place the cam ring and rear collar in fixed relation to one another whereby rotation of the single threaded nut means in one direction moves the threaded nut forward, and through the tongue and groove connection within the rear collar, the nut means also acts to push the rear collar forward, the bracing the cam ring forward in fixed relation to one another pushes the framework forward in a straight line nonrotating manner to cause the cam ring to move forward and engage against the jaws and pivot the forward ends of the jaws radially into engagement about the object and cause the jaws in turn to lock about the object, and rotation of the single threaded nut means rearward through the tongue and groove connection applies a rearward force to the rear collar to push the rear collar, braces, and cam ring rearward in fixed relation to one another in a straight line nonrotating manner to disengage the cam ring from the jaws to free the jaws from their locking engagement about the object, a rod threaded into the sleeve to be turned forward against the shaft, while the cam ring is locked about the jaws, the jaws are locked about the object on the shaft to apply a forward force against the shaft, with the reaction causing the jaws to pull the object rearward off the shaft, a plurality of spring means mounted on said collar adjacent the pivotal mountings having their one ends connected to the collar and their other ends connected to the jaws to simultaneously and continuously bias said jaws outward against the inside edges of the cam ring and cooperate with the cam ring, said jaws when locked about an object of appropriate size, having its outer surfaces tapered to diverge forward and outward gradually along a relatively straight line, said cam ring having an inside diameter less than the outside diameter of the jaws along the forward portions of the jaws and having an inside diameter less than the outside diameter of the jaws along the rearward portions of the jaws, whereby movement of the cam ring forward causes gradual engagement with the jaws causing the jaws to be gradually cammed toward one another, by the cam ring overcoming the action of the springs to the extent to cause the jaws to converge toward one another at a rate as allowed by the cam ring to thereby cause said jaws to be automatically engaged about the object before pulling the object off the shaft, and rearward movement of the cam ring enables the jaws to expand radially outward under the biasing of the springs at a rate as allowed by the cam ring, thereby automatically disengaging and freeing the jaws from the object after pulling the object off the shaft.

* * * * *

UNITED STATES PATENT AND TRADEMARK OFFICE
CERTIFICATE OF CORRECTION

PATENT NO. : 4,007,535

DATED : February 15, 1977

INVENTOR(S) : Paul W. Brandt et al

It is certified that error appears in the above-identified patent and that said Letters Patent are hereby corrected as shown below:

Column 9, line 8, after "nut" insert ---- means ----;

line 10, delete "forward";

line 10, after "bracing" insert --- , and ----;

line 12, delete "pushes" and insert -- , pushing ---;

line 25, after " jaws, " insert ---- and ----;

Column 10, line 13, delete " less " and insert --- greater ---;

line 18, delete : springs " and insert ---- spring means ----;

line 24, delete " springs " and insert ---- spring means ----.

Signed and Sealed this

*Sixteenth* Day of *September 1980*

[SEAL]

*Attest:*

SIDNEY A. DIAMOND

*Attesting Officer*

*Commissioner of Patents and Trademarks*